Patented Dec. 12, 1950

2,533,294

UNITED STATES PATENT OFFICE 2,533,294

EXTRACTION OF TYPE A SPECIFIC SUBSTANCE

Heron O. Singher, Red Hook, N. Y., and Charles R. Harmison, Somerville, N. J., assignors to Ortho Pharmaceutical Corporation, a corporation of New Jersey No Drawing. Application September 14, 1946, Serial No. 697,162

2 Claims. (Cl. 167—74)

This invention relates to and is directed to novel methods and steps in the methods for extracting, concentrating and/or purifying specific type A substances which are probably carbohydrates.

These type A substances are of complex structure chemically. They have the capacity of neutralizing the activity of anti-A agglutinins which are present in normal human sera and are essential for the neutralization of the anti-A agglutinins present in anti-Rh sera derived from mothers of erythroblastotic infants. They are also useful for injection into animals or humans for the production of anti-A agglutinins and these antibodies may be employed for blood grouping instead of the corresponding agglutinins normally present.

According to this invention, mucin or an organ which produces mucin may be treated with a solvent to provide a solution of said substances of type A activity in said solvent. The solvent is preferably an aqueous solution of one or more organic dipolar compounds which when dissolved in water is capable of increasing the dielectric constant of the water to a value corresponding to that obtained by dissolving 1 to 9 milligrams of glycine in 1 milliliter of water. These solutions have dielectric increments in the range of 0.306 to 2.75 Debye units. The solvents are also aqueous solutions of solid amino acids. Examples of some of them are proline, alanine, glutamic acid and glycine. The crux of the invention resides in dissolving or extracting the specific type A material in a solution of an organic dipolar compound. The subsequent steps may be varied as to solvents, precipitating agents, etc. The resultant solution is filtered to remove any undissolved residue and the filtrate is collected. Then to said filtrate is slowly added a quantity of a material capable of separating out inactive material. For this purpose, there may be employed dioxane and a water soluble wetting agent. The temperature of the mass is then reduced to about 1° C. and maintained at said temperature overnight. Then the temperature thereof is allowed to come to room temperature and is filtered through glass wool. The filtrate may then be concentrated by subjecting the same to vacuum and at a temperature of less than 10° C. until the volume thereof is approximately 60% of its original volume. The pH of the resultant concentrate is ascertained and may preferably be adjusted to between 5 to 7 by the use of either an acid or alkali medium depending upon the pH thereof. In order to separate other inactive materials therefrom, the concentrate having a pH between 5 and 7 has slowly added thereto with vigorous stirring at room temperature 20 parts of acetone by volume for each 100 parts by volume of said concentrate. After the last increment of acetone has been added and stirred in said concentrate, the temperature of the mass is reduced to about 1° C. and maintained at said temperature overnight, and subsequently is filtered through glass wool and the filtrate recovered. The filtrate is subjected to a vacuum at a temperature of less than 10° C. and maintained under these conditions until its volume is 60% of its original volume. To this latter concentrate is then added .2 molar phosphate aqueous solution or buffer so that the pH of the concentrate is adjusted to 7.2 and the solid content thereof is 70 milligrams per 100 cc. of water. This solution is then lyophylized to obtain concentrated type A substances in solid form.

The following is a specific example embodying the invention. 400 grams of mucin (obtained on the market commercially as "Granular Mucin Type 1701–W" and sold by The Wilson Laboratories, which is a hog gastric mucin) were stirred into 16 liters of an aqueous solution of glycine containing 2 milligrams of glycine in each milliliter of water. The mass is then centrifuged and the supernatant liquid is decanted from the residual solids. A portion of this liquid (4.14 liters) is removed for testing and to the remainder (11.86 liters) there is added slowly 4.73 liters of dioxane containing .36 gram of a 25% aqueous solution of the sodium sulphate derivative of 2-ethylhexanol. All of this is stirred vigorously at room temperature, stored overnight at 1° C. and the next morning is filtered through glass wool at room temperature. The filtrate is collected and distilled under vacuum at temperature between 0–10° C. until the volume of the residue was 7.17 liters. Then 400 ccs. were removed therefrom for test and to the remainder, which was first adjusted so that its pH was 7.3 with sodium hydroxide, there was added with vigorous stirring about 1.5 liters of acetone and allowed to stand overnight at 1° C. The next morning the mass was filtered through a wool filter at room temperature and the filtrate was recovered. The filtrate was subjected to vacuum at temperature of 0°–10° C. until the volume thereof is about 5 liters. Adjust the pH of the liquid with aqueous solution $Na_2HPO_4$ until it is 7.2. Then the mass is lyophylized to obtain a dry solid specific type A substance.

We claim:

1. The method for extracting specific type A substance from hog gastric mucin, free from preservative or disinfectant, comprising treating hog gastric mucin with an aqueous solution of glycine, the ratio of glycine to water in said solution being in the range of 1 to 9 milligrams of glycine in each 1 milliliter of water.

2. The method of extracting specific type A substance from hog gastric mucin, free from preservative or disinfectant, comprising treating hog gastric mucin with an aqueous solution of an amino acid, said solution having a dielectric increment in the range of from 0.306 to 2.75 Debye units.

HERON O. SINGHER.
CHARLES R. HARMISON.

REFERENCES CITED

The following references are of record in the file of this patent:

UNITED STATES PATENTS

| Number | Name | Date |
|---|---|---|
| 2,290,146 | Witebsky | July 14, 1942 |

FOREIGN PATENTS

| Number | Country | Date |
|---|---|---|
| 479,487 | Great Britain | Feb. 4, 1938 |

OTHER REFERENCES

Morgan, in British Journal of Experimental Pathology, vol. 24, April 1943, pages 41–49.

Goebel, in J. Exptl. Med., vol. 68 (1938), pp. 221–227.

Oliver-Gonzales, in J. Infect. Dis., vol. 74 (2), pp. 81–84 (1944).